(12) United States Patent
Toval et al.

(10) Patent No.: US 11,288,710 B2
(45) Date of Patent: *Mar. 29, 2022

(54) ANALYZING THE ADVERTISEMENT BIDDING-CHAIN

(71) Applicant: BI SCIENCE (2009) LTD, Tel-Aviv (IL)

(72) Inventors: Assaf Toval, Herzeliya (IL); Kfir Moyal, Tel-Aviv (IL)

(73) Assignee: BI SCIENCE (2009) LTD, Tel-Aviv (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/658,003

(22) Filed: Oct. 18, 2019

(65) Prior Publication Data

US 2020/0051131 A1 Feb. 13, 2020

Related U.S. Application Data

(63) Continuation of application No. 14/540,541, filed on Nov. 13, 2014, now Pat. No. 10,489,828.

(60) Provisional application No. 61/903,436, filed on Nov. 13, 2013.

(51) Int. Cl.
G06Q 30/02 (2012.01)

(52) U.S. Cl.
CPC ............... *G06Q 30/0275* (2013.01)

(58) Field of Classification Search
CPC ........ G06Q 30/02; G10L 15/02; G06F 21/606
See application file for complete search history.

(56) References Cited

U.S. PATENT DOCUMENTS

| 8,719,022 B2* | 5/2014 | Arrowood | G10L 15/02 704/251 |
| 2010/0145809 A1* | 6/2010 | Knapp | G06Q 30/02 705/14.71 |
| 2012/0069131 A1* | 3/2012 | Abelow | G06Q 10/067 348/14.01 |
| 2015/0206197 A1 | 7/2015 | Toval | |
| 2016/0364565 A1* | 12/2016 | Studen | G06F 21/606 |
| 2020/0279301 A1* | 9/2020 | Buchalter | G06Q 30/02 |

* cited by examiner

*Primary Examiner* — Saba Dagnew
(74) *Attorney, Agent, or Firm* — Smith Tempel Blaha LLC; Gregory Scott Smith (57) ABSTRACT

Automatically collecting advertisement bidding order by automatically accessing at least one Internet content site and presenting the Internet content site with at least one virtual user data and an at least one of IP address representing a geographic location of the virtual user. In response, receiving from the Internet content site advertisement content, and bidding data. Presenting the advertisement bidding data to a user, and/or storing the advertisement bidding data.

18 Claims, 4 Drawing Sheets

ANALYZING THE ADVERTISEMENT BIDDING-CHAIN

CROSS-REFERENCE TO RELATED APPLICATIONS

This application is a non-provisional application being filed under 37 CFR 1.53(b) and 35 USC 111, and being filed as a continuation of U.S. patent application Ser. No. 14/540,541 filed on Nov. 13, 2014, which application claims the benefit of the priority date of the United States Provisional Application for patent that was filed on Nov. 13, 2013 and assigned Ser. No. 61/903,436, each of which are hereby incorporated by reference. This application hereby incorporates U.S. provisional application for patent Ser. No. 61/903,410 titled "Behavioral Content Discovery" and filed on Nov. 13, 2013.

FIELD

The method and apparatus disclosed herein are related to surveying Internet advertisement effectiveness and efficiency and, more particularly, but not exclusively to analyzing the advertisement bidding-chain while performing an Internet advertisement survey.

BACKGROUND

Personalized advertisement provided through the Internet is well known in the art. Personalized advertisement operates by adapting the advertisement presented to a user visiting a web page to the characteristics associated with that particular user. Therefore, when surfing the Internet and visiting various web pages, different users are presented with different advertisements. A typical web page has one or more advertising placeholders. When the web page is accessed by a visiting user, the advertisement placeholders are automatically auctioned between advertisers. If no advertisement is placed, the auctioneer—the advertisement exchange agent—forwards the placeholder to another auctioneer. The placeholder can be transferred between several auctioneers before an advertisement is placed.

Internet advertisement surveys study the offering of advertisements presented to various users. The advertisement survey enables an advertiser to understand how a user experiences Internet advertising and the impact of a particular ad in view of the overall offering of advertisements. An advertisement survey is therefore focused on the relative impact of a particular advertisement. However, Internet advertisement surveys do not track the way advertisements are placed, and therefore the advertiser lacks information as to how to increase the impact and efficiency of his advertisement budget.

Typically, when a user visits a web page configured to present advertisements, the determination of where the advertisements are placed may involve communicating with advertisement exchange servers to execute real-time bidding on behalf of the advertising entities. The advertisement exchange servers communicate with advertising servers to perform the real-time bidding. When an advertising server wins the bid it places an advertisement within the visited web-page. This complex process takes about a second and may be repeated while the user is viewing the web page. While an advertisement survey may collect some information pertaining to the advertisements presented to the user, it lacks the knowledge of who delivered the advertisement to the web page and how the bidding was performed.

There is thus a need in the art for, and it would be highly advantageous to have, a method and a system for Internet advertisement surveys to overcome one or more of the above-identified limitations.

SUMMARY OF EXEMPLARY EMBODIMENTS

According to one exemplary embodiment, there is provided a method, a software program, and/or a system, for automatically collecting advertisement bidding information, such as the order of the bids. An exemplary method may include the steps of: an Internet server automatically accessing at least one Internet content site, presenting the Internet content site with at least one virtual user data and at least one IP address representing a geographic location of the virtual user, receiving from the Internet content site advertisement content, receiving from the Internet content site advertisement bidding data, and performing at least one of: presenting the advertisement bidding data to a user, and storing the advertisement bidding data.

According to another exemplary embodiment, there is provided a method, a software program, and a system, for automatically collecting advertisement bidding order. An exemplary method may include the steps of: an Internet server automatically accessing at least one Internet content site, presenting the Internet content site with at least one virtual user data and at least one of IP address representing a geographic location of the virtual user, receiving from the Internet content site advertisement bidding-code, executing the bidding-code, receiving from the Internet content site advertisement content, and performing at least one of: presenting the advertisement content to a user, storing the advertisement content, presenting the bidding-code to a user, and storing the bidding-code.

According to another exemplary embodiment, there is provided a method, a software program, and a system, for automatically collecting advertisement bidding order and additionally creating targeting data. The data may include a content collection, the content collection including one or more Internet content site addresses and/or a link to an Internet content site, and/or a universal resource locator (URL) of an Internet content site. The data may include a user collection, the user collection including one or more virtual user data including characteristic data and/or behavioral data of a user in a data structure comprehensible by the Internet content site. The data may include a user geo-location including at least one geographic location of the virtual user. The data may include an advertisement collection including at least one advertisement characteristic data structure.

According to another exemplary embodiment, there is provided a method, a software program, and a system, for automatically collecting advertisement bidding order where the bidding data includes any of: a JavaScript code, IP address of a bidder, bidder identification, order of bidders, winning bidder, and winning advertisement.

According to another exemplary embodiment there is provided a method, a software program, and a system, for automatically collecting advertisement bidding order additionally enabling a user to retrieve from the storage the advertisement bidding data according to any of: Internet content site, virtual user data, virtual user geo-location, advertisement content.

According to another exemplary embodiment there is provided a method, a software program, and a system, for automatically collecting advertisement bidding order and additionally enabling a user to retrieve from the storage the advertisement bidding data according to any of: IP address of a bidder, bidder identification, order of bidders, winning bidder, and winning advertisement.

According to another exemplary embodiment, there is provided a method, a software program, and a system, for automatically collecting advertisement bidding order additionally enabling a user to retrieve from the storage the advertisement bidding data including one or more parameters of a group of survey parameter, responsive a selection of at least another parameter of the group of survey parameters, where the group of survey parameters includes one or more:

parameters of a web page in which a bid was conducted;
participating biding agents;
biding agents representing a particular advertisement;
biding agents managing advertisement placeholders and bidding;
biding agents participating in a bid;
biding agents winning a bid for a particular advertisement;
advertisement wining a bid;
a place of a particular advertisement when losing a bid;
a place of a particular advertisement when winning a bid;
virtual user data for which bids were won;
virtual user geo-location for which bids were won;
webpages in which a particular advertisement participated in a bid
webpages in which a particular advertisement won a bid;
biding agents participating against a particular advertisement;
biding agents representing a particular advertisement;
biding agents winning a bid for a particular advertisement;
the virtual agent profile and parameters which participated in a bid, and
the web page for which the bid was conducted.

Unless otherwise defined, all technical and scientific terms used herein have the same meaning as commonly understood by one of ordinary skill in the relevant art. The materials, methods, and examples provided herein are illustrative only and are not intended to be limiting. Except to the extent necessary or inherent in the processes themselves, no particular order to steps or stages of methods and processes described in this disclosure, including the figures, is intended or implied. In many cases, the order of process steps may vary without changing the purpose or effect of the methods described.

Implementations of the methods and systems of the embodiments described herein involve performing or completing certain selected tasks or steps manually, automatically, or any combination thereof. Moreover, according to actual instrumentation and equipment of the embodiments of the methods and systems described herein, several selected steps could be implemented by hardware or by software on any operating system of any firmware or any combination thereof. For example, as hardware, selected steps of embodiments described herein could be implemented as a chip or a circuit. As software, selected steps of embodiments described herein could be implemented as a plurality of software instructions being executed by a computer using any suitable operating system. In any case, selected steps of the method and system of the embodiments described herein could be described as being performed by a data processor, such as a computing platform for executing a plurality of instructions.

BRIEF DESCRIPTION OF THE DRAWINGS

Various embodiments are described herein, by way of example only, with reference to the accompanying drawings.

With specific reference now to the drawings in detail, it is stressed that the particulars shown are by way of example and for purposes of illustrative discussion of the embodiments only, and are presented in order to provide what is believed to be the most useful and readily understood description of the principles and conceptual aspects of the embodiments. In this regard, no attempt is made to show structural details of the embodiments in more detail than is necessary for a fundamental understanding of the subject matter, the description taken with the drawings making apparent to those skilled in the art how several forms and structures may be embodied in practice.

In the drawings.

DESCRIPTION OF EMBODIMENTS

The principles and operation of a method and a system for analyzing advertisement bidding-chain according to several exemplary embodiments may be better understood with reference to the drawings and accompanying description.

Before explaining at least one embodiment in detail, it is to be understood that the embodiments are not limited to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The present embodiments comprise a method and a system for Internet advertisements surveys, and more particularly, to analyzing the advertisement bidding-chain. Analyzing the advertisement bidding-chain enables an advertiser, for example: to compare bidding strategies, compare bidding platforms and services, improve the impact of its advertising campaign, and improve the budgetary efficiency of an advertising campaign.

In this document the term advertising bidding refers to online bidding and/or real-time bidding for advertisement placement within a particular webpage visited by a particular user. The term advertising bidding-chain refers to the sequence, or the order, in which bidders and advertisements participate in the bidding, until a bid is won by a particular participant (i.e. bidder) for a particular advertisement.

Web pages accessible over the Internet may have advertisement placeholders. When a user visits such a web page, a bid is executed for each such placeholder. The bid is typically issued by a bidding-code (program, software), which may be implemented as a JavaScript as a non-limiting example. The bidding-code is typically automatically downloaded from the web-page placeholder and executed by the browser or other application of the visiting user that is accessing the web page. Typically, the bidding-code communicates with a bidding agent. A bidding agent may also be named an ad-exchange or an ad-network. The bidding agent may represent many advertisers, advertising agencies, and/or advertisements. The bidding agent operates a set of rules to place bids for advertisements until one of the advertisements wins the bid, or until no advertisements wins the bid. The bidding-code may then communicate with another bidding agent until a bid is won, or not.

The term advertising bidding-chain refers to the process in which bidding is performed, the order in which bidding agents and advertisements participate in the bidding, and the bidding results. A bidding event may result in the placement of a particular advertisement (the winning advertisement) by a particular bidding agent (the winning bidding agent), or by no advertisement placement at all (a failed bid).

Another way of seeing the bidding-chain is the address-chain or addressing-chain. While the bidding-chain represents the sequence of bidding agents participating in a bid for a particular advertisement placement or placeholder, the address-chain represents the sequence of web or IP addresses processed by the bidding-code. There may be other entities participating in the process, such as advertising aggregators, typically aggregating web pages offering advertisement placeholders for bidding. In this document, unless otherwise stated, bidding-chain and address-chain may be used interchangeably.

One goal of at least some of the embodiments described herein is to survey, collect, gather and provide bidding-chain information in various situations, such as different web-pages and different characteristics of the visiting user. Such a capability can be very advantageous to a company in determining its advertising strategy. For instance, a company may want to determine why they lose a large percentage of bidding events during a particular period of time, such as during the summer or during certain holidays or even during certain times of the day or week. Likewise, a company may want to analyze why its advertising budget has increased by 20% over the last 6 months without a significant change in the number of ads that they were successfully able to place. By having the ability to parse and analyze such bidding-chain information based on a variety of parameters, the company may be able to gain an understanding of what is happening and make adjustments. As a non-limiting example, suppose a company's advertising revenue increases by 20% during the Spring months and then returns to normal thereafter. The company may want to examine the bidding-chain for various web-sites and visiting users to see if there is a cause. Suppose the company determines that during the Spring, a particular competitor that focuses on tennis apparel and equipment greatly increases its aggressiveness in placing ads. This is indicated by the competitor being quite active in each of the bidding-chains during this period of time thus driving up the winning price for bid placements. Based on this information, the company can then look at alternative advertisement channels, decrease its aggressiveness in winning bids, lower a threshold for the maximum value of its bids, etc.

Figure 1:
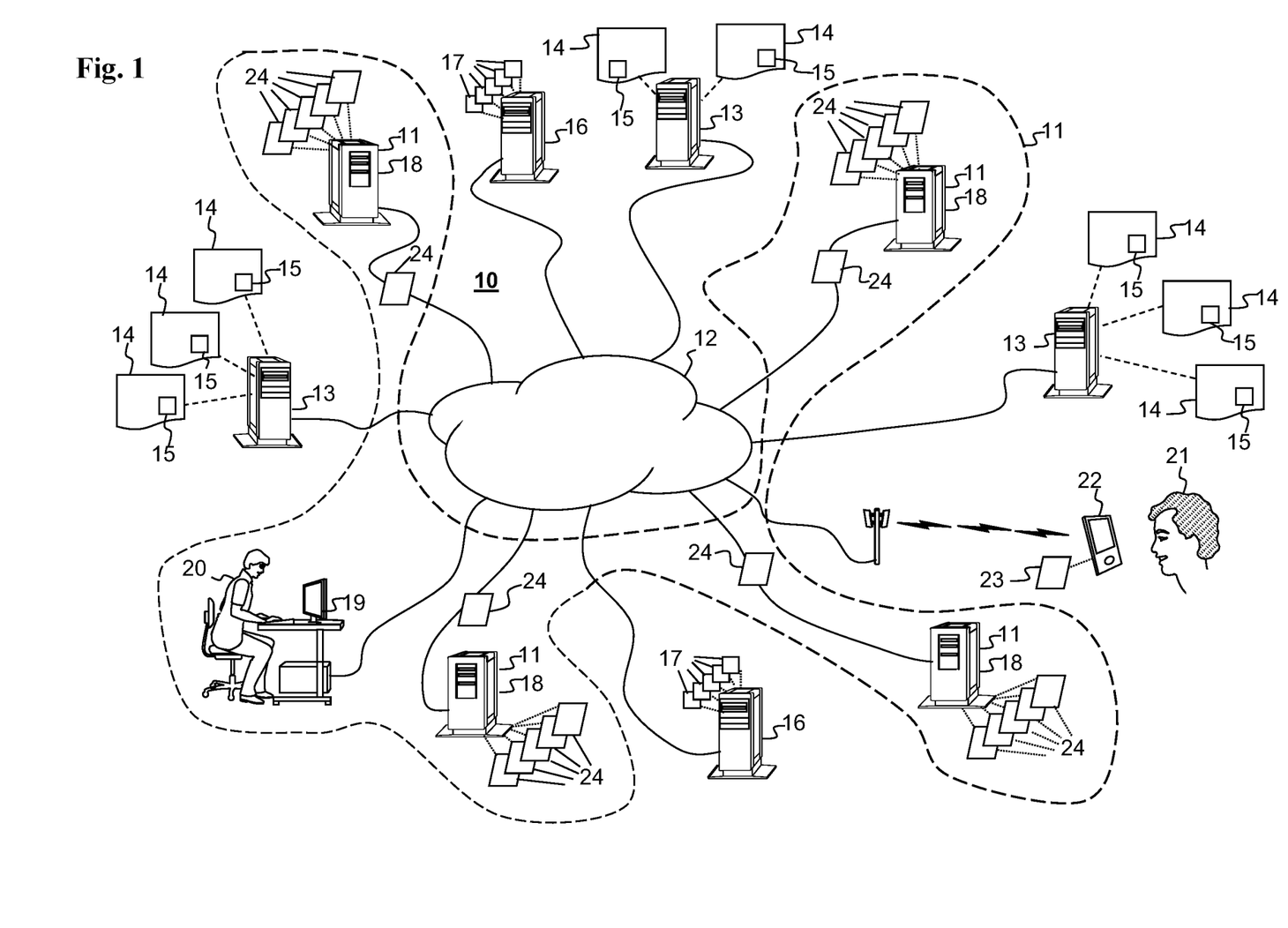
FIG. 1 is a simplified illustration of an advertising survey environment with an advertising survey system for analyzing the advertisement bidding-chain.

Reference is now made to FIG. 1, which is a simplified illustration of an advertising survey environment 10 with an advertising survey system 11 for analyzing the advertisement bidding-chain according to an exemplary embodiment.

As seen in FIG. 1, the advertising survey environment 10 may include the following elements:

A public data communication network such as the Internet 12;

A plurality of content servers 13 communicatively coupled to the data communication network 12 and typically containing content 14, such as websites and/or web pages, wherein the content 14 typically contains advertisement placeholders 15;

A plurality of advertising servers 16 communicatively coupled to the data communication network 12 and typically containing various advertisements content 17 (also named advertisement 17 for short); and An advertising survey system 11, which may include a plurality of survey servers 18 and one or more terminals or workstations 19, all typically communicatively coupled to the communication network 12 (both the entire system and its components are designated by numeral 11). It should be appreciated that terminals or workstations 19 can also be connected directly to advertising survey system 11. Terminals or workstations 19 are typically operated by one or more users 20, who function as the operators or administrators of the advertising survey system 11.

It should be appreciated that the advertising survey environment 10 shown in FIG. 1 is simplified, and, for example, an advertising server 16 may represent a complex system of servers storing, bidding, exchanging and transporting advertisements between advertisers and viewed web-pages. It should be appreciated that the advertising servers 16 can represent a network of servers, typically hierarchical and/or tiered within which the functions of the advertising servers 16 is distributed. The servers and/or functions of the advertising servers 16 may thus be distributed between different business entities such as advertisers, advertising agencies, ad-exchange services, etc., where each entity may operate its own servers and provide some of the functions of one or more of advertising servers 16.

In general, a user surfing the internet, such as user 21, accesses Internet content 14, such as a website or a web page hosted by a content server 13. The accessed web site or web page of interest includes one or more advertisement placeholders 15 into which an advertisement will be placed. When accessed by the user 21, the content 14 and/or the content server 13 contacts an advertising server 16 that ultimately operates to identify and place an advertisement 17 into one of the placeholders 15 of the content. Typically, the content server 13 also provides the advertising server 16 with some user information pertaining to the particular user currently accessing the particular content 14. Such user information may be derived from various sources such as the Internet address of the user's computing device 22 and user data 23 (such as user profile information, mined information, public information and historical information as a non-limiting examples). It is noted that the term user data 23 in some places in this document can include the Internet address of the user's computing device 22.

The computing device 22 may be any device or system used by the user to surf the Internet and to access Internet content. A few non-limiting examples of a computing device may include a cellular telephone, a smartphone, a tablet computer, a notebook, a laptop computer, and a personal computer. Thus, when a user 21 accesses web-based content 14, information about the user's computing device 22, the user data 23 and the Internet address, can have an affect in the selection of which advertisements 17, as well as the format or look-and-feel of that advertisement, is presented to the user 21 and rendered on the computing device 22.

As a simple, non-limiting example, if the user data 23 indicates that the user is a male that is 23 years of age, then gender and age appropriate advertisements may be identified as available for one or more of the placeholders 15 existing within the content 14.

The user data 23 can include any of a wide variety of information types characterizing the user and made available to the visited website, web page, or server. The user data 23 is typically made available to the visited website or web page, namely the content 14, and/or content server 13. The user data 23 is typically made available automatically by the browser used by the user's computing device 22 but, it should be appreciated that a user may manually choose to release such data and, the user may have the ability to limit the types and amounts of data released. Further, user data 23 may be accessible from publicly accessed databases, may be previously mined and available in a private database hosted by other components in the system, such as the content servers 13 as a non-limiting example.

Exemplary goals that may be addressed by various embodiments of the advertising survey system 11 are to survey, collect, gather and provide the bidding-chain information. Bidding-chain information may be collected by advertising survey system 11 in various situations, such as different web-pages and different characteristics of the visiting user as characterized by user data 23. This may be performed by presenting the visited web-pages with a variety of user characteristics such as user data 23.

In the illustrated embodiment, the user data 23 may be made available to the visited website, web page, or server, automatically, by a browser emulator module used by the survey server 18, in the form of virtual user data 24. When performing advertisement surveys, the advertising survey system 11 may access a plurality of content websites and/or web pages presenting the content 14 with one or more virtual user data 24, as well as virtual user Internet address (IP address). The virtual user IP address may be the IP address of the particular survey server 18 accessing a particular content server 13 containing a particular content 14.

To make a particular virtual user data 24 available for presentation to the visited website, web page, content 14, and/or content server 13, the survey server 18, using the browser emulator module, creates and/or collects the required data by visiting particular other websites, web pages, content 14, and/or content servers 13 prior to visiting the surveyed website, web page, content 14, and/or content server 13.

The virtual user data 24 collected or aggregated by the survey server 18, using the browser emulator module, may be stored and made available as:

an Internet address of a website referencing (linking) to the surveyed website;

an Internet address of a website visited prior to visiting the surveyed website;

a cookie, typically stored in the user's computing device 22;

user profile information;

browsing history of the user; etc.

It should be appreciated that a particular content 14 may be provided by several content servers 13. Therefore, accessing the particular content 14 from different survey servers 18 located in different geographical locations, may result in accessing a different server 13, and possibly thereafter contacting a different advertisement server 16, and receiving a different advertisement 17.

Figure 2:
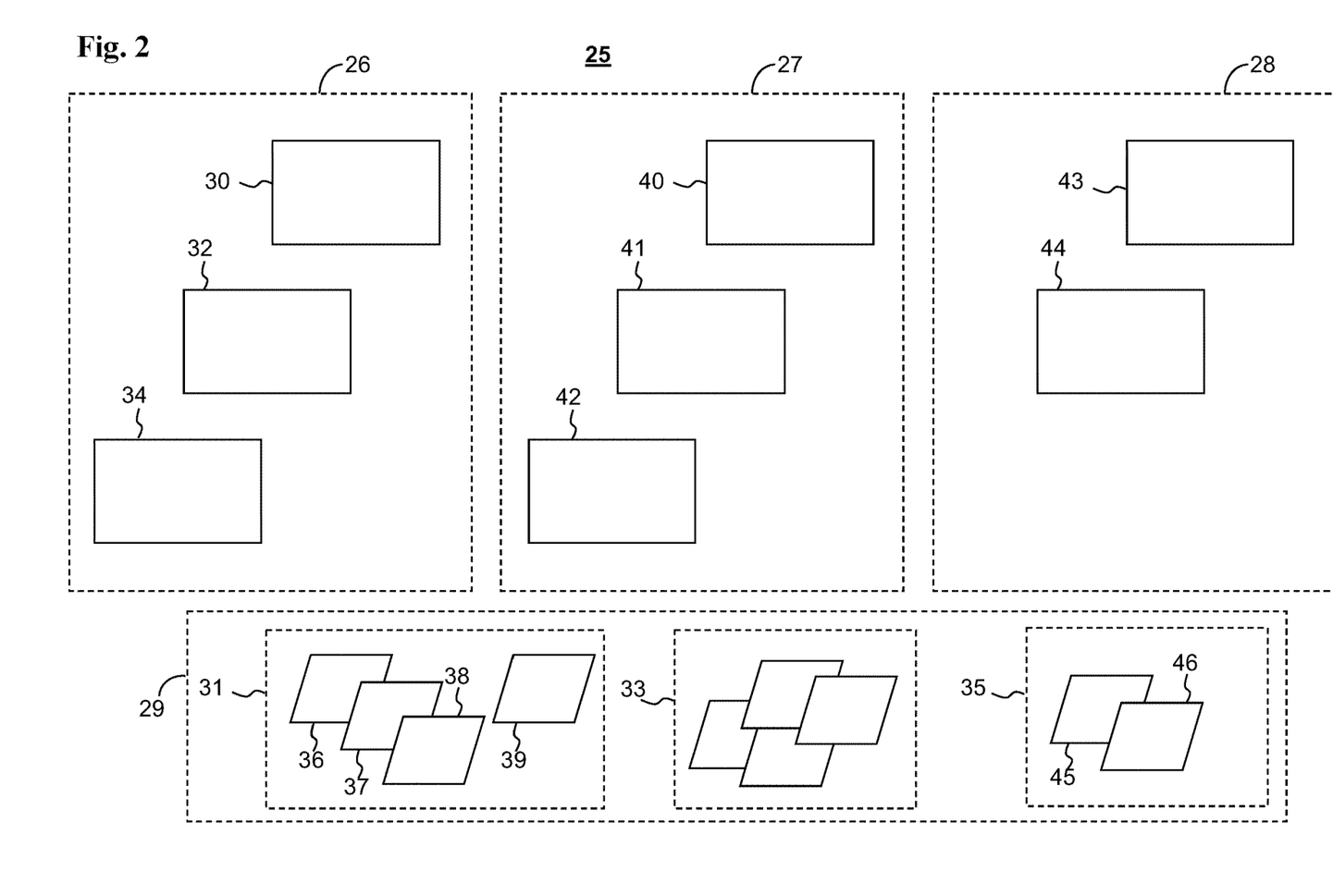
FIG. 2 is a simplified block diagram of software program for the advertising survey system for analyzing the advertisement bidding-chain.

Reference is now made to FIG. 2, which is a simplified block diagram of software program 25 for advertising survey system 11 for analyzing the advertisement bidding-chain according to an exemplary embodiment.

As seen in FIG. 2, software program 25 may include the following components:

A human interface module 26;

A survey module 27;

An analyzing and reporting module 28; and

A storage and/or database module 29;

The human interface module 26 may include:

A human interface module 30 for setting advertising survey parameters 31 and launching an advertising survey;

A human interface module 32 for managing the analysis of survey results 33; and/or A human interface module 34 for presenting survey results 33 and/or analysis results 35;

Survey parameters 31 are typically stored in the storage or database module 29 and may contain: content database 36, geo-location database 37, virtual-user database 38 containing a plurality of virtual user data 24, and one or more survey data sets 39, each typically containing a plurality of virtual user data 24.

Content database 36 may contain a collection of links to, or addresses of, content, websites and/or web pages, such as content 14, that are known to include advertisement placeholders 15, or a similar mechanism for participating in advertising bidding. The links or addresses may be in the form of IP address, URL (Uniform Resource Locator) or http (HyperText Transfer Protocol) links such as "http://www.yahoo.com/finance/new-posts".

The content database 36 may contain a collection of target content addresses, as described above, where each target content address may be associated with or characterized by a set of parameters, such as content type (e.g. culture, business, entertainment, sales, etc.), business type (e.g. automotive, electric appliances, medical devices, etc.), type of target audience (general public, professionals, etc.), etc.

Human interface module 30 may enable a user of advertising survey system 11, such as user 20 of FIG. 1, to perform various operations on the content database 36, such as:

Add or remove a target content address.

Add or remove target content characteristics.

Associate a target content address with one or more target content characteristics or any other relevant parameter.

Select one or more target content addresses for a survey, for example by selecting one or more particular target content addresses or by selecting one or more content characteristics or other relevant parameters.

In this respect, a user 20, when operating advertising survey system 11 to perform a survey of advertising bidding chains, or for analyzing the results of a survey of advertising bidding chains, may be named in this document a surveying user.

Geo-location database 37 may include a list of IP addresses operated by the survey server 18. Each such survey server IP address may be associated with a geographic location such as a country, state, province, region, city, etc. Therefore a survey server 18 using a particular survey server IP address appears to a content server 13 content 14 as a user connecting from the associated geographic location.

Human interface module 30 may enable a surveying user using advertising survey system 11, such as user 20 of FIG. 1, to perform various operations on the Geo-location database 37, such as:

Add or remove an advertising survey system 11;

Add or remove an IP address of an advertising survey system 11;

Add or remove a geographic location;

Associate an IP address of an advertising survey system 11 with a geographic location; and/or Select one or more geographic locations for a survey;

Human interface module 30 may enable a surveying user to perform various operations on the virtual-user database 38, such as:

Add or remove a virtual user data 24;

Add or remove a characteristic of virtual user data 24;

Change a particular characteristic of a particular virtual user data 24; and/or Select one or more virtual user data 24 for a survey;

When a surveying user selects a set of survey parameters including: one or more target content addresses for a survey, one or more geographic locations for a survey, and/or one or more virtual user data 24 for a survey, the surveying user may create a survey data set 39 containing the selected data.

Human interface module 30 may enable a surveying user to execute a survey of advertising bidding according to the parameters selected for the survey, such as contained in a survey data set 39 as described above.

Survey module 27 may include:

A geographic distribution module 40;

A content scanning module 41; and/or

A bidding scanning module 42;

As seen in FIG. 1, advertising survey system 11 may include a plurality of survey servers 18. Survey servers 18 may be distributed in different geographical locations, typically representing different types of users or consumers. The survey servers 18 may be located in various countries, states, provinces, regions, cities, etc. Alternatively, distributed proxies may be used instead of the distributed survey servers 18.

The survey server 18 or the proxy has one or more IP addresses associated with its location. Thus, when content 14 is accessed by such survey server 18 or proxy, the content 14 recognizes the IP address of the accessing survey server 18 or proxy and serves it with advertisements oriented towards are relevant to the particular location represented by the IP address. Therefore, each survey server 18 (or proxy) may be associated with a particular location. The geographic distribution module 40 distributes survey data set 39 to the various survey servers 18 (or proxies) according to their locations, such as in accordance with the locations as defined in the geo-location database 37.

Content scanning module 41 accesses the various content 14 as defined in the survey data set 39. According to the survey data set 39, the content scanning module 42 loads a particular virtual user data 24, performs the steps required to obtain the necessary user characteristics as detailed in the virtual user data 24, and then accesses a particular content 14 as defined in the survey data set 39. This routine or process may be repeated until all the virtual user data 24 instances and all the content 14 instances are exhausted.

When the content scanning module 41 accesses a particular content 14, the bidding scanning module 42 downloads the bidding-codes provided by the particular content 14, executes the bidding-codes, collects the survey results 33 and stores them in the storage/database module 29. Each bidding-code may be associated with a bidding agent, or identify a bidding agent.

Analyzing and reporting module 28 may include an analysis module 43 and reporting module 44. After a survey is completed, the analysis module 43 may analyze the survey results 33 in view of their associated geo-locations and virtual user data 24 to create statistical data 45. Thereafter, a user, such as user 20 of FIG. 1, can access the advertising survey system 11 and use the reporting module 44 to configure a particular report 46 presenting a particular cut through the data contained in the storage/database module 29, and particularly the statistical data 45.

A description of the advertising survey system 11 is further provided in U.S. provisional patent application No. 61/903,410 titled "Behavioral Content Discovery", which is incorporated herein above by reference in its entirety.

Figure 3:
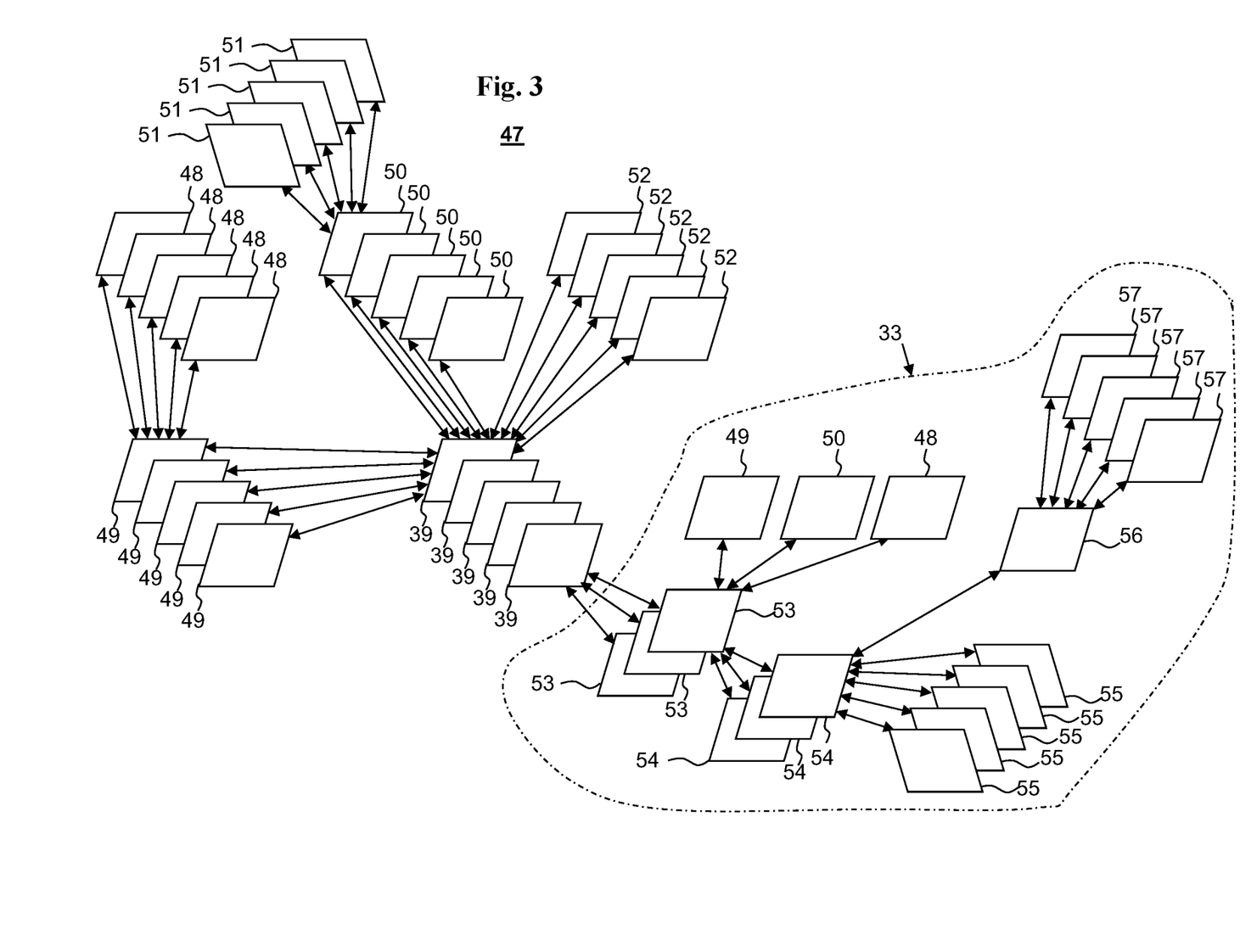
FIG. 3 is a simplified data structure of a database structure 1 stored in storage/database module of the advertising survey system for analyzing the advertisement bidding-chain.

Reference is now made to FIG. 3, which is a simplified data structure of a database structure 47, which may be stored in storage/database module 29, according to an exemplary embodiment.

As seen in FIG. 3, database structure 47 may include the following data structures (tables, records, and/or parameters):

Virtual user parameters 48;

Instances 49 of virtual user data 24, which may be stored in virtual-user database 38, where each instance 49 of virtual user data 24 is associated with a particular set of virtual user parameters 48;

(It should be appreciated that hereinafter in FIG. 3, where a data structure, such as virtual user data instance 49, is associated with a plurality of data structures, such as virtual user parameters 48, such virtual user parameters 48 may also be associated with a plurality of virtual user data instances 49. A surveying user can therefore search for all the virtual user parameters 48 associated with a particular virtual user data instance 49, or for all the virtual user data instances 49 associated with particular virtual user parameters 48.)

Content identifiers 50, each identifying a content 14 (or a website, or a web page containing content) that may be stored in content database 36;

Content characterizing parameters 51, where each particular content identifier 50 may be associated with a particular set of content characterizing parameters 51;

Geo-locations identifiers 52 that may be stored in Geo-location database 37;

Survey data sets 39, where each survey data set is typically associated with a particular set of an instances 49 of virtual user data 24, a set of content identifier 50, and a set of Geo-locations identifiers;

Bidding survey instances 53 resulting from a survey executed by a particular survey server 18, using a particular geo-locations identifier 52, and a particular instance 49 of virtual user data 24, accessing a particular content 14 identified by a content identifier 50. The data record of the bidding survey instance 53 may include a geo-locations identifier 52, an instance 49 of virtual user data 24, a content identifier 50 and/or a collection of bidding chain instances 54.

These bidding chain instances 54 result from the interaction of the particular geo-locations identifier 52 virtual user data instance 49 with the advertisement placeholders 15 associated with content identifier 50. Each bidding chain instance 54 results from the execution of a bidding-code associated with a particular advertising placeholder. Each bidding chain instance 54 represents the results of the bidding executed by one or more bidding agents on behalf of the respective advertisement placeholder and with regard to the particular virtual user data instance 49 and geo-location presented by the survey server 18 to the particular content 14. Each bidding chain instance 54 may include:

A list, or chain, or a sequence, of bidding agents identifiers 55 according to their order of participation in the bidding process;

An advertisement 56 winning the bidding (if any), associated with the winning bidding agent and with a particular set of advertisement characterizing parameters 57. (The data collected for the winning advertisement may include HTML code typically including the ad binary file and HTML parameters such as size, location on the page, etc.)

As shown in FIG. 3, following the execution of a bidding survey instance 53, a particular bidding agent 55 is typically associated with one or more bidding chain instances 54 in which the bidding agent 55 participated.

A surveying user (such as user 20 of FIG. 1) can therefore interrogate the database 29 for a particular bidding agent 55 and retrieve the winning advertisements 56 represented by the bidding agent 55, the content 14 (or content identifier 50, as well as content characterizing parameters 51) where the bidding agent 55 participated in a bidding, the geo-locations identifiers 52 and virtual user data instance 49 (as well as virtual user parameters 48) that the bidding agent 55 served, etc.

Similarly, a surveying user can interrogate the database 29 for a particular content 14, or content identifier 50, as well as a plurality of content identifier 50 characterized by particular content characterizing parameters 51 and retrieve the winning advertisements 56, the bidding agents 55 that participated in the biddings, as well as the bidding agents 55 winning a bidding, the geo-locations identifiers 52 and virtual user data instance 49 (as well as virtual user parameters 48) associated with the winning advertisements, etc.

For example, a surveying user may execute a query to show him all the bidding agents 55 (ad-networks) that are managing their own ad-placements inside a website such as Yahoo.com. The advertising survey system 11 will then search the database 29 for all ad-placements (winning advertisements 57) picked in yahoo.com, within all their associated scanned pages (content 14, or content identifier 50). For example, the advertising survey system 11 will then pick only the first bidding agents 55 serving domain which the system detected in the survey process. The advertising survey system 11 then presents the surveying user with a list of all bidding agents 55, their respective content identifier 50 where they represented a winning advertisement 57. The representation is typically by name, and the surveying user requests one or more websites by name (e.g. Yahoo) and receives a named list of bidding agents 55.

In another example, the surveying user selects a particular winning advertisement 57 and receives a list of content identifiers 50 presenting that winning advertisements 57, and/or a list of bidding agents 55 representing that winning advertisements 57, etc.

It is appreciated that any combination of query parameters and query results are contemplated herein.

Figure 4:
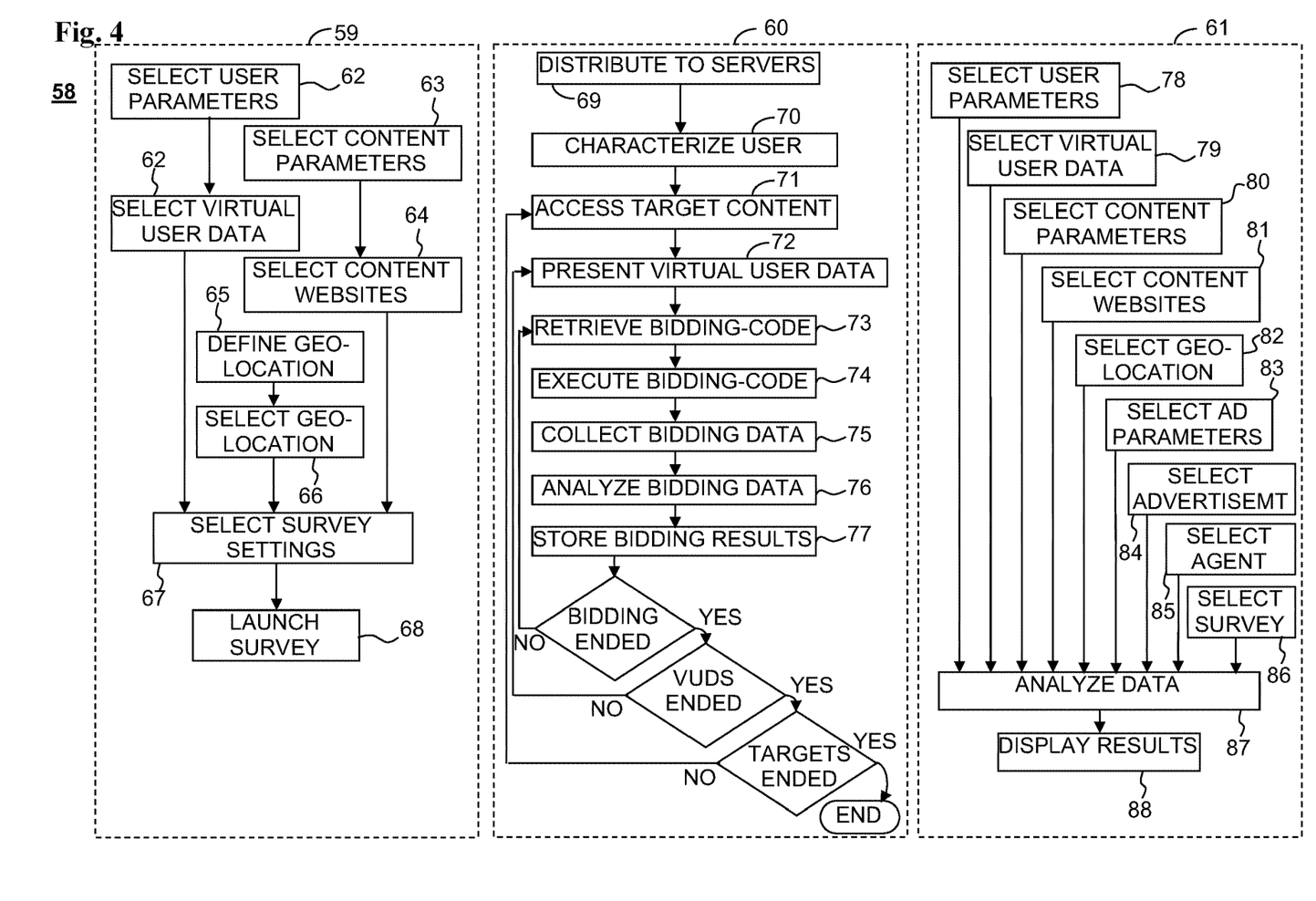
FIG. 4 is a simplified flow chart of process implementing the advertising survey method including analyzing the advertisement bidding-chain.

Reference is now made to FIG. 4, which is a simplified flow chart of process 58 implementing the advertising survey method, including analyzing the advertisement bidding-chain, according to an exemplary embodiment.

It is therefore appreciated that the advertising survey system 11, by executing one or more survey data sets 39, and cumulating survey data 33, may create correlations and/or associations between virtual user parameters 48 (as well as virtual user data instances 49), content characterizing parameters 51 (as well as content identifiers 50), geo-locations identifiers 52, and advertisement characterizing parameters 57 (as well as winning advertisement 56) and bidding agents 55.

As seen in FIG. 4, software program 58 may include the following actions or processes:

Action 59 for setting the advertisement survey parameters and for launching the survey, typically using human interface modules 26 and/or 30;

Action 60, for executing advertisement surveys including collecting, storing and analyzing survey results; and/or Action 61 for analyzing and reporting survey results, typically using human interface modules 26 and/or 32 and/or 34.

In the performance of action Action 59, the advertising survey system 11 may enable a surveying user, such as user 20 of FIG. 1, to prepare and launch an advertisement survey. Initially 62, the user 20 may select one or more virtual user parameters 48 to create a new instance 49 of virtual user data 24. In step 62, user 20 may select one or more instances 49 of virtual user data 24 for a new survey. In step 63, user 20 may select one or more virtual content parameters 51 to create a new content identifier 50. In step 64, user 20 may select one or more content identifiers 50 for the new survey. In step 65, user 20 may create or define a new geo-location identifier 52. In step 66, user 20 may select one or more geo-location identifiers 52 for the new survey. By selecting instances 49 of virtual user data 24, content identifiers 50 and geo-location identifiers 52, the user creates a new survey data set 39. In step 67, user 20 may select a survey data set 39 and in step 68, user 20 may use the selected survey data set 39 to launch an advertisement survey. It is appreciated that user 20 may launch an advertisement survey using any number of survey data sets 39. It should also be appreciated that although these steps are generally described as being user initiated, the actions may also be implemented by a computer running a script or an algorithm that invokes one or more of the operations based on a set of rules, heuristics, input, results, etc.

In the performance of action Action 60, the advertising survey system 11 may execute one or more survey data sets 39. The advertising survey system 11 typically starts in step 69 by distributing one or more survey data sets 39 to appropriate survey servers 18 according to the selected geo-location identifiers 52 provided in the respective survey data sets 39. Thereafter, each of the survey servers 18 of the advertising survey system 11 executes the survey data sets 39 it is allocated.

A survey server 18 typically starts by executing step 70 in which the survey server 18 accesses one or more of content 14 to create and accumulate user characteristics according to the virtual user data 24 provided in the respective survey data set 39.

The survey server 18 may then proceed by executing step 71 in which the survey server 18 accesses one or more of the content 14 in advertising servers 16 according to the content identifiers 50 provided in the respective survey data set 39. The survey server 18 then executing step 72 presents the virtual user data 24 of step 70 to the respective content 14.

The survey server 18 may then proceed by executing step 73 in which the survey server 18 retrieves one or more bidding-codes from content 14 in advertising servers 16 and executes the bidding code (or bidding codes) in step 74.

The survey server 18 may then proceed by executing step 75, in which the survey server 18 retrieves bidding data associated with the execution of the bidding-codes. The survey server 18 then analyzes the bidding data in step 76, and in step 77 the survey server 18 stores the survey results 33 in the storage or database module 29.

The analysis performed by survey server 18 by executing step 76 may include identifying all the steps, components and participants of the bidding process as well as their order and roll in the process. The analysis may include:

Identifying the bidding agents (or other participants) associated with the bidding-codes;

Identifying the order, or sequence of the bidding agents (or other participants);

Identifying the participating advertising entities;

Identifying the participating advertisements;

Identifying the wining advertisement (if any advertisement wins the bidding process);

Identifying the progression of the bids from a value perspective (i.e., the value of the initial bid, the value of increase for subsequent bids, the speed at which the value ramped up, the rate of value increases, etc.;

Identifying the characteristics of the winning advertisement (typically relating to advertisement characteristics parameters 57).

The survey server 18 may repeat steps 73-77, typically until all bidding is ended. The survey server 18 may repeat steps 72-77 until all virtual user data 24 included in the survey data set 39 are used. The survey server 18 may repeat steps 71-77 until all content 14 survey data set 39 are accessed.

In step Action 59, the advertising survey system 11 may enable a user, such as user 20 of FIG. 1, to prepare and provide an analysis of the survey results 33. User 20 can select any combination of parameters such as:

one or more virtual user parameters (step 78) and/or predefined virtual user data 24 (step 79);

one or more content parameters (step 80) and/or predefined content 14 (step 81);

one or more geo-location identifiers 52 (step 82);

one or more advertisement characteristics parameters 57 (step 83) and/or one or more particular winning advertisements 56 (step 84);

one or more bidding agent identifiers (step 85); and/or select a survey (step 86).

Thereafter, the advertising survey system 11 may enable the user 20 to execute the analysis of the survey results 33 per the selected parameters (step 87) thus creating statistical data 45. Thereafter, the advertising survey system 11 may enable the user 20 to inspect, display or otherwise provide the analysis results (step 88), for example by providing a particular report 46.

Thus, the advertising survey system 11 enables the user 20 to analyze and display the survey results 33 in different ways such as:

According to a bidding agent 55 (ad-exchange agent, ad-networks) managing a particular advertisement placeholder. The advertising survey system 11 may display the first bidding agents 55 (typically by their names) that were picked as being the one making the first ad call for a particular advertisement placeholder.

According to a bidding chain. The advertising survey system 11 typically displays the bidding chain instances 54 from the bidding agent 55 managing the advertisement placeholder to the winner bidding agent 55. For example: bidding agent A (managing the advertisement placeholder) followed by (or connecting to) bidding agent B followed by (or connecting to) bidding agent C followed by (or connecting to) Network D (the bid winner—managing the winning advertisement 56).

According to any selected set of advertisement characteristics.

The advertising survey system 11 may analyze the survey results 33 from a business perspective rather than a technical perspective. For example, a user may execute a query and/or a report showing all the bidding agents 55 managing advertisement placeholders 15 in a particular advertising server 16 such as Yahoo.com. The advertising survey system 11 may search the storage or database module 29 (or survey results 33) for bidding chain instances 54 retrieved and executed for all advertisement placeholders 15 within content 14 provided by the particular advertising server 16 such as (e.g. Yahoo.com). The advertising survey system 11 may select only the first bidding agents 55 serving the domain detected. The advertising survey system 11 may aggregate all the data and present the user with a list of all the bidding agents 55 and their respective content identifiers 50 where they managed a winning advertisement 56.

In this example the representation is by name, meaning that the user requests a list of bidding agents 55, and the advertising survey system 11 displays a list of names. In another example the user can request one or more particular advertisements served by one or more particular bidding agents 55 served within one or more particular content server 13.

It is appreciated that by conducting one or more advertisement surveys the advertising survey system 11 enables a user to interrogate the aggregated database 29, analyze the survey results 33, and compute correlations between the various parameters, predefined and/or collected, such as the data structures shown and described with reference to FIG. 4.

It is expected that during the life of this patent many relevant advertisement systems and applications will be developed and the scope of the terms herein, particularly of the terms "advertisement bidding", "bidding agent" and "bidding chain", is intended to include all such new technologies a priori.

Additional objects, advantages, and novel features of other possible embodiments will become apparent to one of ordinarily skill in the art upon examination of the provided examples, which are not intended to be limiting. Additionally, each of the various embodiments and aspects as delineated hereinabove and as claimed in the claims section below find experimental support in the provided examples.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A method for automatically analyzing a bidding chain, the method comprising:
the steps of:
a. automatically accessing, by an Internet server having a browser emulator module, at least one Internet content site by the browser emulator module that presents said Internet content site with a plurality of virtual user data and at least one of IP address paired with each virtual user data and representing a geographic location of said virtual user;
b. automatically receiving, by said Internet server, from a placeholder on said Internet content site advertisement bidding-code;
c. automatically executing, by said browser emulator module of said Internet server, said bidding-code;
d. receiving, by said Internet server, from said Internet content site, advertisement content that is selected responsive to the browser emulator module executing the bidding-code received for each of the plurality of virtual user data and IP address pairs presented to the Internet content site by the browser emulator module;
e. storing at least one of: said advertisement content, and said bidding-code; and
f. repeating said steps a to e.

2. The method according to claim 1, wherein said step of repeating said steps a to e is being repeated until completion of said bidding for said placeholder.

3. The method according to claim 1, wherein said step of repeating said steps a to e is being repeated using the same Internet content site and a different IP address each time.

4. The method according to claim 1, wherein said step of repeating said steps a to e is being repeated using the same IP address and a different Internet content site each time.

5. The method according to claim 1, additionally comprising ordering said at least one of: said advertisement content, and said bidding-code according to at least one of:
order of occurrence;
respective IP addresses; and
respective web page accessed.

6. The method according to claim 1, additionally comprising the step of enabling a user to retrieve advertisement bidding data.

7. An advertisements surveying system comprising:
a module for accessing, by an Internet server, automatically, at least one Internet content site;
a browser emulator module configured to present said Internet content site with a plurality of virtual user data and IP addresses representing a geographic location of each of said plurality of virtual user data;
a module for automatically receiving from said Internet content site advertisement bidding-code;
a module for automatically executing said bidding-code received for each particular virtual user data and IP address pair;
a module for receiving from said Internet content site advertisement content that is selected responsive to the module for automatically executing said bidding code, executing said bidding code with at least one virtual user data and at least one IP address presented to the Internet content site; and
a module for storing at least one of: said advertisement content, and said bidding-code;
wherein said advertisements surveying system is configured to repeat the following actions:
access said Internet content site;
present said Internet content site with said plurality of virtual user data and IP addresses;
receive from said Internet content site advertisement bidding-code;
execute said bidding-code received for each particular virtual user data and IP address pair;
receive from said Internet content site advertisement content that is selected responsive to the said executed bidding code; and
store at least one of: said advertisement content, and said bidding-code.

8. The system according to claim 7, wherein said actions are being repeated until completion of said bidding for said placeholder.

9. The system according to claim 7, wherein said actions are being repeated using the same Internet content site and a different IP address each time.

10. The system according to claim 7, wherein said actions are being repeated using the same IP address and a different Internet content site each time.

11. The system according to claim 7, additionally comprising: a module for ordering said at least one of: said advertisement content, and said bidding-code according to at least one of:
order of occurrence;
respective IP addresses; and
respective web page accessed.

12. The system according to claim 7, additionally comprising:
a user-interface module enabling a user to retrieve advertisement bidding data.

13. A computer program product embodied in a non-transitory computer-readable storage medium and configured to cause a programmable processor of a computing device connected to the Internet to automatically collect information associated with an advertisement bidding event by performing the steps of:
a. accessing, by an Internet server, automatically, at least one Internet content site by presenting to said Internet content site at least one virtual user data and at least one of IP address representing a geographic location of said virtual user;
b. automatically receiving, by said Internet server, from said Internet content site advertisement bidding-code;
c. automatically executing said bidding-code;
d. receiving, by said Internet server, from said Internet content site advertisement content that is selected responsive to automatically executing said bidding code for at least one virtual user data and at least one IP address pair presented to the Internet content site;
e. storing at least one of: said advertisement content, and said bidding-code; and
f. repeating said steps a to e.

14. The computer program product according to claim 13, wherein said step of repeating said steps a to e is being repeated until completion of said bidding for said placeholder.

15. The computer program product according to claim 13, wherein said step of repeating said steps a to e is being repeated using the same Internet content site and a different IP address each time.

16. The computer program product according to claim 13, wherein said step of repeating said steps a to e is being repeated using the same IP address and a different Internet content site each time.

17. The computer program product according to claim 13, additionally comprising:

ordering said at least one of: said advertisement content, and said bidding-code according to at least one of:
- order of occurrence;
- respective IP addresses; and
- respective web page accessed.

18. The computer program product according to claim 13, wherein said computer program product additionally comprises a step of enabling a user to retrieve advertisement bidding data.

* * * * *